Aug. 20, 1957 A. E. ULMANN 2,803,313
FLUID CONTROL VALVE FOR SHOCK ABSORBERS
Filed Aug. 20, 1954 5 Sheets-Sheet 4
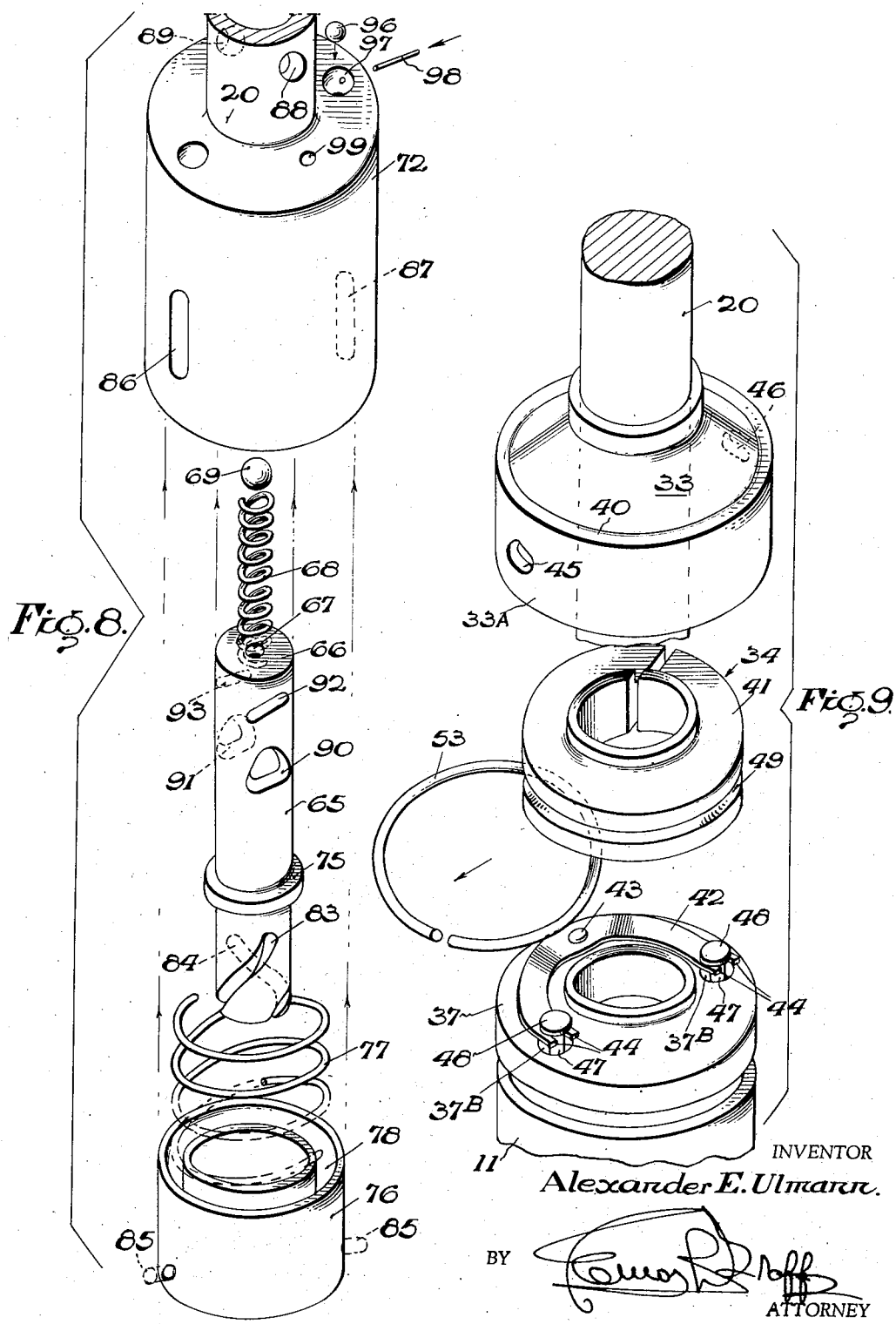
INVENTOR
Alexander E. Ulmann.
BY
ATTORNEY

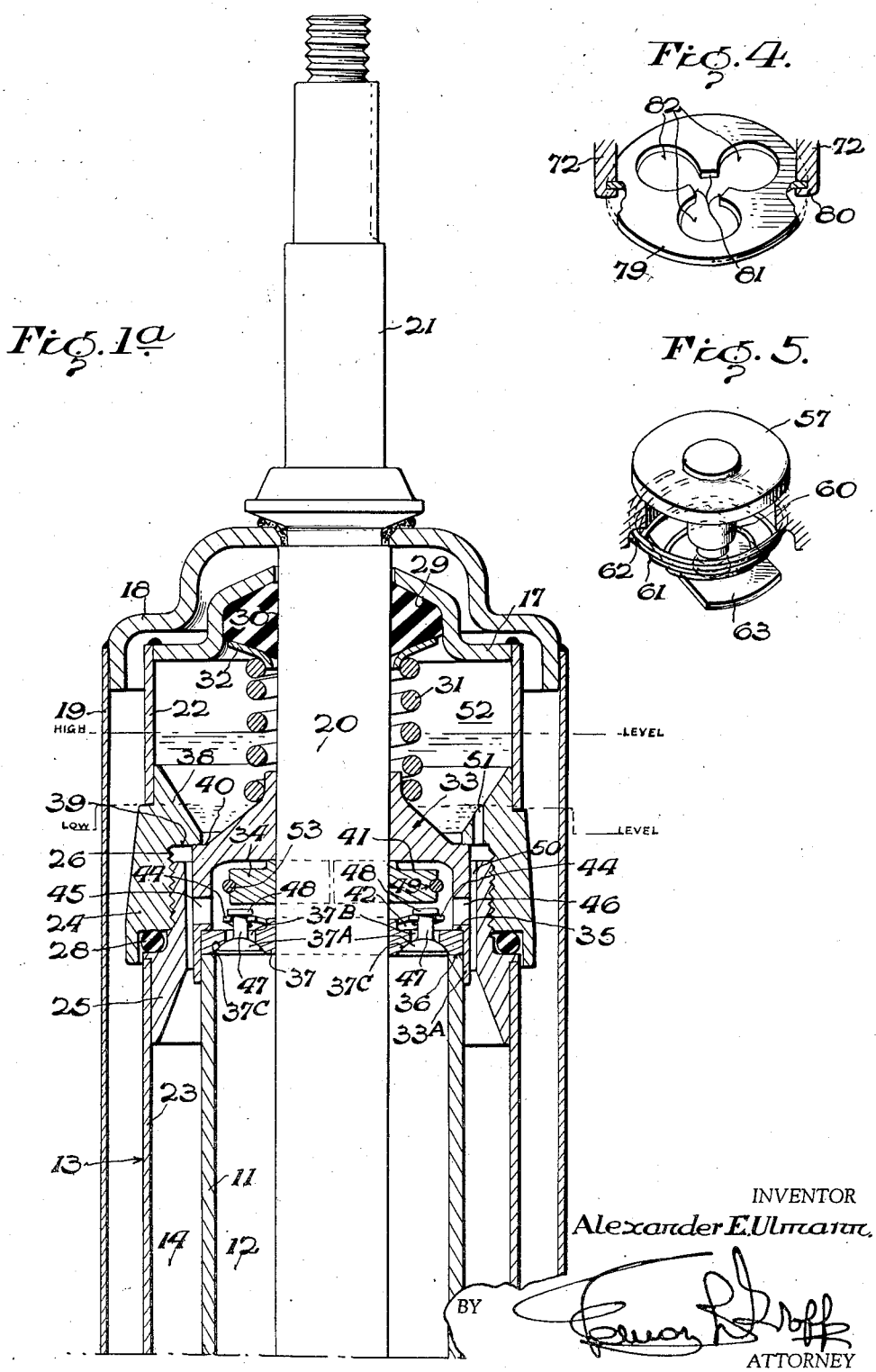

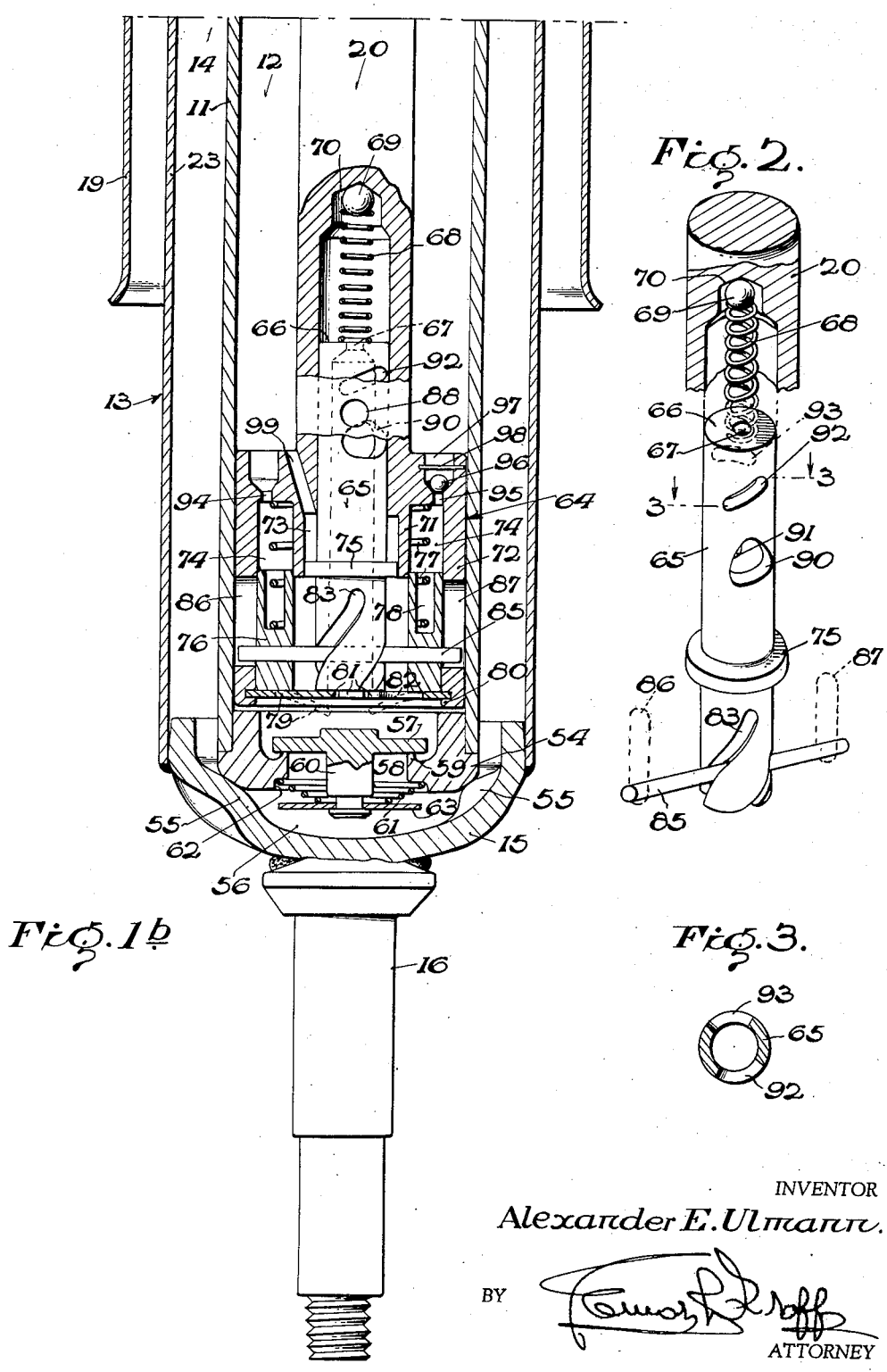

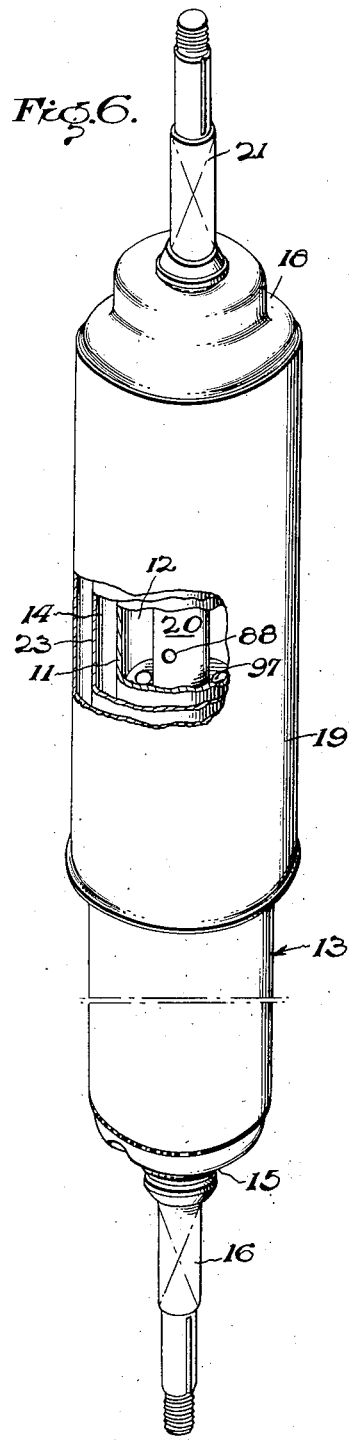

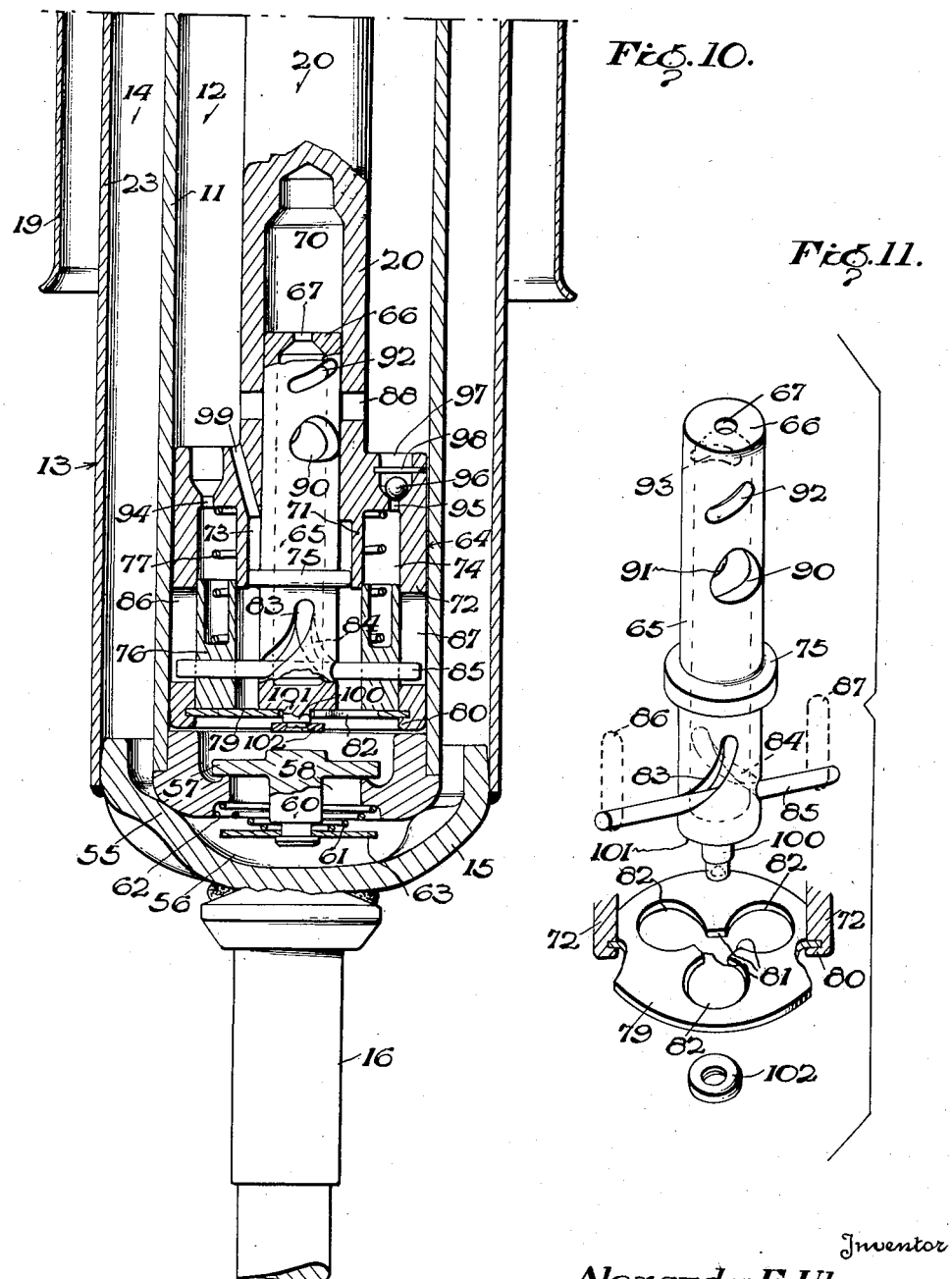

United States Patent Office 2,803,313
Patented Aug. 20, 1957

2,803,313

FLUID CONTROL VALVE FOR SHOCK ABSORBERS

Alexander E. Ulmann, New York, N. Y.

Application August 20, 1954, Serial No. 451,141

12 Claims. (Cl. 188—88)

This invention relates to shock absorbers and is more particularly concerned with fluid control means for shock absorbers.

Although this invention has general application to shock absorbers used for many different purposes, including automobiles, the landing gear of aircraft, and other vehicles, its widest field of application is in the case of automobiles, and will, therefore, be described with respect thereto, although it is to be understood that it is not limited thereto.

It is well known that an automobile or other similar vehicle has a tendency to roll while negotiating a turn in the road due to centrifugal force acting on its mass. Such a roll involves a low frequency movement of shock absorbers on the vehicle. A high resistance is required by the shock absorber to counteract such a roll. However, there are other conditions to which the vehicle is commonly subjected, which require an entirely different reaction by the shock absorber. For example, in traveling over a road having a rough surface, the vehicle is subjected to high frequency vibrations of short amplitude. Again, a sudden shock may be imparted to the vehicle by suddenly striking a large object on the road. This may be termed a "major bump" condition. Shocks of this kind require a high damping on the compression stroke of the shock absorber but it is not desirable to have the same conditions on the rebound.

It is apparent, therefore, that a shock absorber, to be effective, must provide for all these various conditions and combinations thereof, to which the vehicle is ordinarily subjected and that no single functional characteristic of a shock absorber can meet such requirements. Moreover, the shock absorber must be effective irrespective of the load carried by the vehicle.

Accordingly, it is the general object of this invention to provide a shock absorber with fluid control means that alters its functional characteristics in relation to the requirements of specific conditions to which the vehicle is subjected, particularly as to roll, rough roads, bumps, overloading, and combinations of such conditions, and irrespective of the load carried by the vehicle.

Another object of the invention is the provision of a shock absorber having a plurality of functional characteristics in relation to resistance and to recovery from impact, and means for automatically controlling the movement of parts to provide for a selective operation thereof under any given conditions to which the vehicle may be subjected.

A further object of the invention is the provision of a hydraulic shock absorber comprising a hydraulic column, a plunger assembly in the column, and valve means for controlling the action of the plunger in response to the magnitude, direction and duration of forces imparted during the operation of the vehicle.

These and other objects and advantages of the invention will appear more fully from the following description considered together with the accompanying drawing.

In the drawing:

Fig. 1a is a longitudinal cross sectional view of the upper portion of a shock absorber comprising an embodiment of the invention.

Fig. 1b is a longitudinal cross sectional view of the lower portion of the same shock absorber in full compression.

Fig. 2 is a perspective view of the rotary sleeve member.

Fig. 3 is a sectional view along the line 3—3 of Fig. 2.

Fig. 4 is a perspective view of the bottom support member forming a part of the plunger assembly.

Fig. 5 is a perspective view of the bottom relief valve, apart from the device as a whole.

Fig. 6 is an overall perspective view of the embodiment, partly broken away.

Fig. 7 is a view similar to Fig. 1b with the plunger in its neutral position.

Fig. 8 is an exploded perspective view of the plunger assembly.

Fig. 9 is an exploded perspective view of the upper valve of the piston chamber.

Fig. 10 is a view similar to Fig. 1b showing a modified form of the invention.

Fig. 11 is an exploded view in perspective of the modified elements of Fig. 10.

Referring with more particularity to the drawing in which like numerals designate like parts, the embodiment illustrated comprises an inner tubular member 11 forming the piston chamber 12, and an outer tubular member 13 coaxially disposed to provide between its walls and the tubular member 13 an annular chamber 14. The lower end of the outer tubular member 13 is welded or otherwise secured to a cup-shaped or dished member 15 forming the bottom end wall of the device and to which a mounting shank 16 or other suitable mounting member is rigidly secured.

The upper end of the tubular member 13 is welded or otherwise secured to an end wall 17. Overlying the end wall 17 is an inverted cup shaped member 18 from which there depends a tubular dust shield 19 about the upper portion of the outer tubular member 13.

A shaft 20 having an upper mounting shank 21 is coaxially disposed in the chamber 12 and is secured to the upper end member 18.

The outer tubular member 13 has an upper portion 22 separated from the remaining portion 23 and there are interposed between these two portions threaded coupling members 24 and 25. The upper coupling member 24 is welded or otherwise secured to the upper portion 22 and carries internal threads 26. The lower coupling member 25 is secured to the upper end of the other portion 23 and has external threads 27 which engage the threads 26, substantially as shown. A sealing ring or washer 28 of rubber or other suitable material is interposed between the two members 24 and 25, as shown.

The end wall 17 is so formed as to provide an annular pocket 29 around the shaft 20 and containing a doughnut-shaped gasket 30 of rubber or other suitable material. This gasket is maintained under compression by a coil spring 31 surrounding the shaft 20. The upper end of the coil spring 31 engages a metal ring or shield 32 disposed against the bottom of the gasket 30 and the bottom end of the spring is in contact with the upper end of a collar 33.

The lower portion of the collar 33 is hollow to receive a valve operator 34. The lower end of the collar 33 is recessed to provide an annular downwardly facing shoulder 35 in alignment with the upper end 36 of the inner tubular member 11. A flat ring 37 comprises the end wall of the chamber 12 and it is interposed between the said shoulder 35 and upper end 36. The ring 37 is provided with valves 37A disposed in apertures 37B. The valves 37A are normally held in their closed positions against the valve seats 37C by a semi-circular leaf spring 42 or other suitable resiliently yieldable means. The spring 42 is secured at a point between its ends by a rivet 43 or other suitable means, to the top of the ring 37, the outer ends being bifurcated to provide fingers 44 which straddle shanks 47 attached to the valves. The shanks 47 project upwardly through the apertures 37B and are provided at their upper ends with buttons 48 against the bottom sides of which the fingers 44 are in resilient contact to urge the valves to their closed positions.

The valve operator 34 is in the shape of a split ring having a recessed portion 41 at the top to reduce contact area between it and the bottom of the collar 33, thereby decreasing surface tension in the presence of oil to avoid sticking of the operator to the collar 33. The operator 34 also has a peripheral groove 49 which acts as a seat for a resilient split band or snap ring 53 by means of which the operator is held snugly in contact with the shaft 20 for movement therewith, but capable of sliding thereover upon the application of a force sufficient to overcome the friction between them. This frictional force, however, is greater than the force of the spring 42 holding the valves closed, so that upon downward movement of the shaft 20, the operator 34 will contact the top of the valves 37A and open them against the action of the spring 42.

The annular wall 33A surrounding the hollow portion of the collar 33 is provided with openings or ports 45 and 46 above the ring 37.

The openings 45 and 46 communicate with an annular space 50 between the collar 33 and the lower coupling member 25 which is open to and communicates with the annular chamber 14 between the tubular members 11 and 13. A duct 51 through the portion 38 provides communication between the chamber 14 and the reservoir chamber 52 above the collar 33 and coupling member 24.

The bottom of the inner tubular member 11 is closed with an end wall 54 that is provided with a valve. The end wall rests against upward projections 55, three being sufficient, of the end wall 15 of the outer tubular member 13, thereby providing free communication between the chamber 14 and the space 56 beneath the end wall 54.

The valve in the end wall 54 comprises a disc 57 normally covering an aperture 58 in the said end wall and in contact with an annular seat 59 thereof. An arm 60 secured to the disc 57 projects downwardly through the aperture 58 to receive at its lower end the smaller end of a spiral spring 61. The upper and larger end of the spiral spring is seated in a recess 62 at the bottom of the wall 54. The lower end of the arm 60 also carries beneath the spring 61 a bar 63 which, in the upper position of the valve, contacts the bottom of the wall 54, thereby limiting the movement thereof and preventing a reversing of the spiral spring.

The plunger assembly comprises a piston 64 which is presented as an enlarged portion of the lower end of the shaft 20 in slidable contact with the inner wall of the tubular member 11. This piston is normally disposed between the top and bottom of the chamber 12. The lower end of the shaft 20 is hollow for the reception of a hollow rotary sleeve member 65 with which it is slidably engaged. The upper end of the member 65 has an end wall 66 which is provided with a small orifice 67, and between the end wall 66 and the upper end of the hollow space in the lower end of the shaft 20, there is disposed a coil spring 68, a ball bearing 69 as a thrust bearing being interposed between the upper end of the spring 68 and a recess 70 in the shaft as a seat for the ball, to permit free rotation of the sleeve 65 relative to the shaft 20.

The interior of the piston 64 is provided with an interior annular wall 71 which projects downwardly between the shaft 20 and the outer wall 72 of the piston forming thereby an annular space 73 between the wall 71 and sleeve 65 and an annular space 74 between said portion and the wall 72. The rotary sleeve member 65 has a collar flange 75 which is normally slidably disposed in the annular space 73. Slidably engaged with the walls forming the annular space or sleeve piston chamber 74 is a sleeve piston 76 which is normally held in extended or downward position by means of a coil spring 77 within the space 74 and in an annular recess 78 of the sleeve piston.

The bottom of the sleeve piston 76 rests on a ring member 79 at the bottom of the piston 63. The ring member 79 is held in place by a crimped edge 80 of the bottom of piston 64.

The ring member 79 has inwardly projecting resilient cantilever fingers 81 upon which the bottom of the rotary sleeve 65 rests. These fingers are formed in making the ring by punching out lobes 82 and these lobes are sufficiently large to expose portions of the bottom of the sleeve piston 76.

The rotary sleeve 65 is provided with a pair of diametrically disposed diagonal slots 83 and 84 below the collar flange 75 and a pin 85 is radially disposed through these slots. This pin also extends on either side through apertures in the wall of the sleeve piston 76 below the recess 78 therein and through vertical slots 86 and 87 of the piston wall 72.

Above the piston 64, the shaft 20 is provided with a pair of diametrically opposite port holes 88 and 89. The rotary sleeve 65 is provided with a corresponding pair of port holes 90 and 91 which may be of a generally triangular shape, as shown, or other shape to provide specific operating characteristics as will be apparent from the explanation hereinafter. In the operation of the device, the port holes 90 and 91 will assume various positions with respect to the port holes 88 and 89 and acting thereby as a valve to modify the flow of liquid through the plunger assembly. In addition, there is also provided above the port holes 90 and 91, slotted openings 92 and 93, generally horizontal with a slight incline, as shown, and normally out of alignment with the port holes 88 and 89, the lower ends of the said slotted openings being, normally, just above said port holes.

Calibrated orifices 94 and 95 are provided through the piston 64 to communicate the space above the piston with the annular space 74. One orifice 94 is permanently open and the other orifice 95 is provided with a check valve in the form of a ball 96 resting on top thereof in a recess 97. A retainer pin 98 is set above the ball 96 in the said recess.

The piston 64 is also provided with a breather duct 99 for the annular space 73 which extends through the piston from the top of the said space to a point adjacent the exterior of shaft 20.

From an intermediate position of the plunger assembly, forces acting upon the shock absorber will tend to move the shaft 20 downwardly or upwardly, as the case may be, in the chamber 12, carrying with it the plunger assembly. When the motion is upward, the flow of oil through the upper end of the chamber 12 is blocked because the shaft 20 will move the member 34 to its upper position out of contact with the valve 37A.

When the relative motion of the shaft 20 is downward, the valve operator 34 is moved to its lowermost position, thereby opening the valves and permitting oil displaced by the shaft 20 to flow through the ducts 45 and 46 into the annular chamber 14, any excess thereof going into the reservoir chamber 52 through the duct 51, said reservoir chamber being only partially filled with oil and having an air space above the liquid level, there being sufficient oil in the system to always maintain the level of oil in the chamber 52 above the duct 51 to prevent aspiration and entrainment of air. Oil is replenished in the chamber 12 on the upstroke of the shaft 20 by the opening of the bottom relief valve 57, the differential pressure for this being effected by the removal of a portion of the shaft 20 from the chamber 12.

In the case of a vehicle negotiating a turn, it will tend to roll due to centrifugal force acting on its mass. Such a roll involves a low frequency movement of the shock absorber. High resistance to counteract the roll is required of the device. Under such conditions, a constant pressure is generated against the bottom exposed area of the sleeve piston 76. As this piston moves up against the action of the spring 77, it forces fluid from the annular space 74 through the orifices 94 and 95, and, at the same time, elevates the pin 85 which causes the rotary sleeve 65 to rotate and close the ports 88 and 89 by moving the ports 90 and 91 out of registry therewith.

Unless additional impact forces due to bumps are introduced, these ports 88 and 89 will stay shut and a substantially solid hydraulic supporting column will be presented to prevent the vehicle from rolling toward the outside of the turn.

In the case of a rough road which places the shock absorber under repeated rapid oscillations, the sleeve piston 76 moves upward only partially because of the choking action of the calibrated orifices 94 and 95. Such partial upward movement causes the rotary sleeve 65 to rotate sufficiently to effect a full registration of the ports 88 and 89 with their corresponding ports 90 and 91. This allows free motion of the springs of the vehicle with which the shock absorbers are customarily associated, with just enough damping to prevent wheel bouncing. Under these conditions, it is necessary to have more rebound damping than in the compression stroke, and this is provided by the ball 96 covering the orifice 95. This restricts the flow through the other orifice and as the sleeve piston 76 moves downwardly, the rotary sleeve 65 is rotated in the reverse direction to reduce the openings between the ports 88, 89 and 90, 91, respectively.

In the case of heavy impacts, such as when a vehicle wheel strikes an object, like a rock or a protrusion in the road, it is desirable to introduce a higher damping on the compression stroke, but it is not desirable to have the same conditions on rebound. On such a sudden impact, nearly full rotation is given to the rotary sleeve 65 by the sleeve piston 76 which results in a closing of the ports 88 and 89.

On sudden and unusually severe impact conditions, an excess pressure will be developed on the collar flange 75 and cause the sleeve 65 to be forced upward against the spring 68 without giving the sleeve time to rotate. Under less severe conditions, tension in the spring 68 balances and is in equilibrium with the forces acting upwardly on the collar flange. Under such severe conditions, however, its tension is overcome, whereby the ports 88 and 89 are uncovered by registration with the ports 90 and 91. Consequently, a quick relief on impact is effected. The orifice 67 in the upper end wall 66 acts as a dash pot under such conditions and provides a measure of control without sudden dumping.

After a bump has been negotiated, the rebound, if it is unusual, such as would occur in the case of a large depression, excess hydraulic pressure is generated in the inner chamber 12 and acting, through the duct 99, on the top of the collar flange 75, produces a downward force against cantilever spring fingers 81. This causes the rotary sleeve 65 to move downward beyond its normal lowermost position and causes an alignment between the slots 92, 93 and the ports 88, 89, respectively, thereby relieving the excess pressure. During this downward movement of the rotary sleeve 65, the collar flange 75 moves out of the annular space 73 and prevents excess bending of the fingers 81. These parts are so proportioned that the collar flange 75 will move out of the annular space 73 before the elastic limit of the fingers is reached; otherwise the proper setting of the parts would be lost.

In the modified form of the invention illustrated in Figs. 10 and 11, the spring 68 and ball 69 are eliminated and the ring member 79 is utilized in substitution thereof by providing a central rod 100 projecting downwardly from a bottom wall 101 of the rotary sleeve 65 through the space between the fingers 81. To the lower end of the rod 100 a ring member 102 is secured by crimping or otherwise, for engaging the undersides of the fingers 81 upon movement of the sleeve member 65 upwardly relative to the piston 64. Oil enters the bottom of the sleeve member 65 through the slots 83 and 84.

I claim:

1. A hydraulic shock absorber comprising an elongated tubular member and walls at the ends thereof forming together a confining chamber for a hydraulic fluid, a plunger assembly slidably disposed in said chamber in contact with the tubular member, a shaft having a hollow end connected to the plunger assembly, the other end of the shaft projecting through one of said end walls, valves at the ends of said tubular member, a hydraulic reservoir communicating with said valves, said plunger assembly comprising a hollow cylindrical member slidably mounted in the hollow end of said shaft for rotatable and axial movement relative thereto, the rotational movement of the cylindrical member being about its own longitudinal axis, said hollow end and cylindrical member having apertures therethrough, and means responsive to differential hydraulic pressures in the chamber for moving said cylindrical member relative to the shaft to alter the rotational and axial positional relationship between the apertures of said shaft and the apertures of the cylindrical member.

2. A hydraulic shock absorber as defined by claim 1 in which the hydraulic reservoir comprises a main chamber filled with hydraulic fluid and an auxiliary chamber above the main chamber, partially filled with hydraulic fluid, and means mutually intercommunicating the hydraulic fluids in said chambers.

3. A hydraulic shock absorber as defined by claim 1 in which the end wall of the chamber through which the shaft projects contains one of said valves, resilient means normally holding said valve in a closed position, and an operator frictionally carried by the shaft for opening said valve against the action of said resilient means.

4. A hydraulic shock absorber comprising an elongated tubular member and walls at the ends thereof forming together a confining chamber for a hydraulic fluid, a plunger assembly disposed in said chamber, a shaft having one end connected to said plunger and the other end projecting through one of said end walls, said plunger assembly comprising a piston in slidable contact with the tubular member, means carried by said plunger assembly for communicating hydraulic fluid in the chamber above the piston with hydraulic fluid in the chamber below the piston, said means including a rotary valve mounted for rotation about its own longitudinal axis, cam means on the valve connected to the piston and an actuating member therefor sensitive to differential hydraulic pressures in the chamber.

5. In a hydraulic shock absorber having a reciprocating shaft in an elongated fluid chamber, said shaft having a hollow end in the chamber, a piston carried by the shaft in slidable contact with the walls of the chamber, a hollow cylindrical sleeve in the hollow end of the shaft, said sleeve being rotatably and axially movable relative to the shaft, the rotatable movement of the sleeve being about its own longitudinal axis, said hollow end and sleeve having apertures through the side walls thereof, a member mounted on said piston for reciprocation relative thereto, cam means between said member and said sleeve for moving the sleeve when said member is reciprocated relative to the piston to thereby change the rotational and axial positional relationship between the apertures of the shaft and the apertures of the sleeve, said member having portions thereof exposed to hydraulic fluid in the chamber on either side of the piston.

6. A hydraulic shock absorber as defined by claim 5 and resilient yieldable means biasing the said member to a predetermined position relative to the piston.

7. A hydraulic shock absorber as defined by claim 5 in which the said member is communicated with hydraulic fluid on the upper side of the piston through calibrated ducts, one of said ducts having a check valve to limit the flow of liquid therethrough in one direction only.

8. A hydraulic shock absorber as defined by claim 5 and a collar flange carried by said sleeve, said piston having an annular space for receiving said flange and a duct communicating fluid in the space above the collar with fluid in the chamber above the piston, the opposite side of the collar being in communication with fluid below the piston.

9. A hydraulic shock absorber as defined by claim 5 and resiliently yieldable fingers connected to the piston, said fingers projecting radially inward below and in longitudinal alignment with the sleeve member.

10. A hydraulic shock absorber as defined by claim 5 in which the sleeve member has an end wall within the hollow portion of the shaft, a coil spring mounted in compression between said end wall and the shaft, said end wall having an orifice therethrough for controlling the rate of axial movement of the sleeve through hydraulic fluid in the hollow shaft portion.

11. A hydraulic shock absorber as defined by claim 5 in which the means between the member and the sleeve comprises a camming surface on the sleeve and a pin connected to the member and to the piston in slidable contact with said surface.

12. A shock absorber as defined by claim 11 in which the camming surface is formed by a pair of diametrically opposite helical grooves, said pin extending radially of the sleeve through both of said grooves, the ends of said pin projecting beyond the member in contact with the piston, said piston having vertical grooves for receiving the said ends of said pins.

References Cited in the file of this patent

UNITED STATES PATENTS

| | | |
|---|---|---|
| 2,095,112 | Wallace | Oct. 5, 1937 |
| 2,138,513 | Rossman et al. | Nov. 29, 1938 |
| 2,161,811 | Grebe | June 13, 1939 |
| 2,363,125 | Foster | Nov. 21, 1944 |
| 2,653,682 | Whisler et al. | Sept. 29, 1953 |

FOREIGN PATENTS

| | | |
|---|---|---|
| 673,485 | France | Oct. 8, 1929 |
| 54,039 | France | Nov. 18, 1946 |
| 400,382 | Great Britain | Oct. 26, 1933 |